US012083364B2

(12) United States Patent
Carroll

(10) Patent No.: US 12,083,364 B2
(45) Date of Patent: Sep. 10, 2024

(54) PERSONAL, PORTABLE, PROTECTIVE RESPIRATOR SYSTEM, WITH REPLACEABLE, PROTECTIVE BARRIER AND AIR FILTRATION SYSTEM

(71) Applicant: INCESSANT INNOVATIONS LLC, Florence, TX (US)

(72) Inventor: Dean Carroll, Florence, TX (US)

(73) Assignee: INCESSANT INNOVATIONS LLC, Florence, TX (US)

( * ) Notice: Subject to any disclaimer, the term of this patent is extended or adjusted under 35 U.S.C. 154(b) by 774 days.

(21) Appl. No.: 17/214,781

(22) Filed: Mar. 26, 2021

(65) Prior Publication Data

US 2021/0316168 A1 Oct. 14, 2021

Related U.S. Application Data

(60) Provisional application No. 63/130,597, filed on Dec. 24, 2020, provisional application No. 62/994,841, filed on Mar. 26, 2020.

(51) Int. Cl.
*A62B 18/08* (2006.01)
*A62B 9/04* (2006.01)
(Continued)

(52) U.S. Cl.
CPC .............. *A62B 18/084* (2013.01); *A62B 9/04* (2013.01); *A62B 18/006* (2013.01); *A62B 18/04* (2013.01)

(58) Field of Classification Search
CPC ..... A62B 18/084; A62B 18/006; A62B 18/04; A62B 9/04; A62B 17/04; A41D 13/05; A41D 13/11; A41D 13/12
See application file for complete search history.

(56) References Cited

U.S. PATENT DOCUMENTS 908,108 A * 12/1908 Knudsen ................ A62B 17/04 128/200.27
5,549,104 A * 8/1996 Crump ................... A62B 18/04 128/201.25
(Continued)

FOREIGN PATENT DOCUMENTS

DE 102014215241 A1 * 2/2016 ............. A62B 17/04
KR 200465225 Y1 * 9/2012

OTHER PUBLICATIONS

Patent Cooperation Treaty (PCT) International Application No. PCT/US21/24538, International Search Report and Written Opinion, Jul. 13, 2021.

*Primary Examiner* — Tu A Vo
*Assistant Examiner* — Kelsey E Baller
(74) *Attorney, Agent, or Firm* — Isidore PLLC

(57) ABSTRACT

A portable, personal protective (PPP) respirator includes a protective barrier made of pliable material that expands when air flow is provided to create a volumetric interior air space, the barrier being non-porous and configured with an opening at one end and sealed at all other surfaces. The PPP respirator includes a barrier collar that is bendable to conform to being worn over a neck and shoulders of a person, the barrier collar providing an attachment component around which material from the open end of the barrier is wrapped to hold the protective barrier in place when the barrier collar is worn around the neck of the person. The PPP respirator includes a mantle having a neck opening for placing of the mantle over the person's head, the mantle resting on the person's neck and shoulders and upper torso when worn. The protective barrier prevents direct exposure to an exterior environment.

16 Claims, 8 Drawing Sheets

(51) Int. Cl.

| | |
|---|---|
| ***A62B 18/00*** | (2006.01) |
| ***A62B 18/04*** | (2006.01) |

(56) References Cited

U.S. PATENT DOCUMENTS

| | | | | |
|---|---|---|---|---|
| 6,834,646 | B2 | 12/2004 | Alon et al. | |
| 6,854,459 | B1 * | 2/2005 | Cox | A62B 17/04 2/205 |
| 10,265,553 | B2 | 4/2019 | Boss et al. | |
| 2006/0048776 | A1 * | 3/2006 | Cunningham | A42B 3/286 128/201.22 |
| 2006/0137686 | A1 * | 6/2006 | Macris | A61M 16/107 128/201.22 |
| 2006/0231100 | A1 * | 10/2006 | Walker | A61M 16/08 128/205.25 |
| 2007/0095344 | A1 * | 5/2007 | Abernethy | A62B 17/006 128/201.22 |
| 2014/0298557 | A1 * | 10/2014 | Townsend, Jr. | A61F 9/06 2/8.2 |
| 2015/0083134 | A1 | 3/2015 | Walker et al. | |
| 2020/0206544 | A1 * | 7/2020 | Vaughan | A62B 17/04 |

* cited by examiner

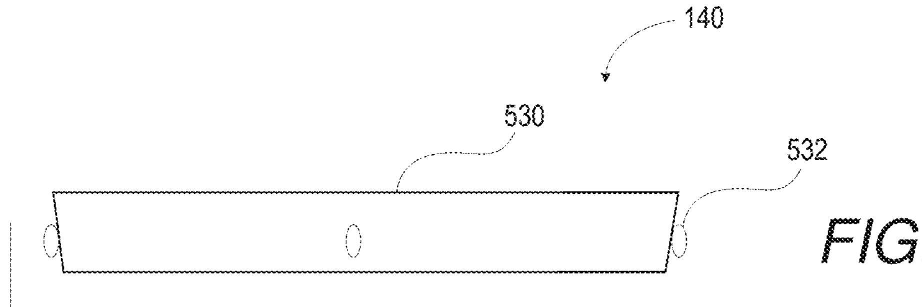
FIG. 5C
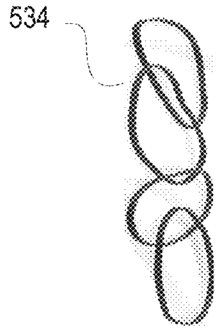
FIG. 5D
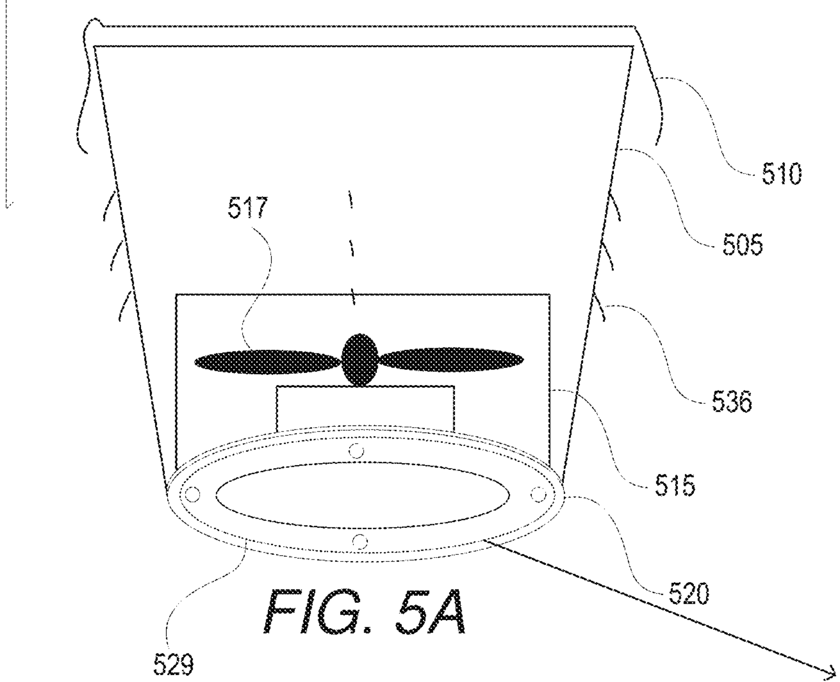
FIG. 5A
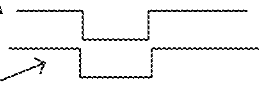
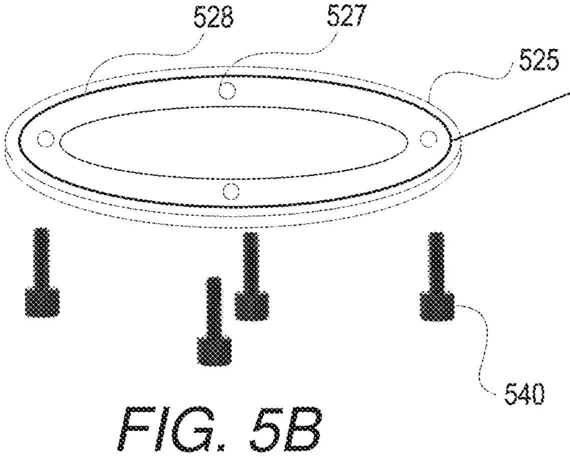
FIG. 5E
FIG. 5B
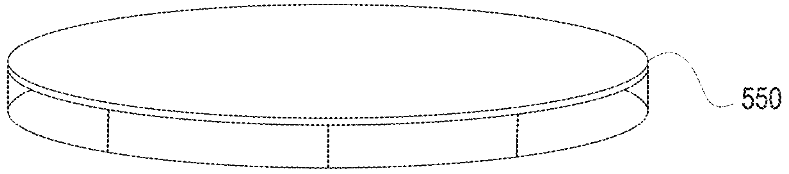
FIG. 5F

PERSONAL, PORTABLE, PROTECTIVE RESPIRATOR SYSTEM, WITH REPLACEABLE, PROTECTIVE BARRIER AND AIR FILTRATION SYSTEM

PRIORITY & RELATED APPLICATIONS

The present application claims priority from U.S. Provisional Application No. 62/994,841, filed on Mar. 26, 2020 and U.S. Provisional Application No. 63/130,597, filed on Dec. 24, 2020, with the entire content of both provisional applications being incorporated herein by reference.

BACKGROUND OF THE INVENTION

1. Field of the Invention

The present disclosure is generally related to a portable, personal protection air respirator system with disposable protective barrier and air filtration mechanism for user safety.

2. Description of the Related Art

Respirators and breathing devices, such as facemasks, are a commonly used item and exist in many forms. The typical function is to provide a specific breathable environment to the subject. This breathable environment is typically 'improved' from the ambient environment by providing air that has been filtered to remove particulate or germs, or air that has been "altered" or provided from a modified air source, such as an oxygen tank, to suit a specific need such as within an oxygen tent.

The majority of respirator/masks that rely on inhalation all have the same issue as they rely on the lungs of the subject to perform the inhalation or breathing movement within a breathing environment. The breathing environment is often a vacuum, which is more susceptible to bringing in ambient air. Also, unless routed via a separate chamber, exhaled air contains significant moisture and causes issues with fogging and condensation. Breathing dependent masks, if punctured, would draw ambient air into the breathing environment.

While full face masks are known, the air seals of these masks are around the neck, which makes the seal difficult to pull over the larger diameter of the head and then seal well on the smaller diameter of the neck. These designs also have the disadvantage of sealing around the neck which is uncomfortable and potentially restrictive. Full oxygen tents or respirator beds are restrictive for obvious reasons. They are large and cumbersome and very expensive. Equally importantly, they restrict the mobility of the user, who remains contained within the space of the enclosure.

SUMMARY

According to one aspect, the present disclosure provides portable, personal protective (PPP) respirator system. The PPP respirator system includes a protective barrier assembly that includes a protective barrier made of a pliable material and which expands when air flow is provided into an interior of the material to create a volumetric interior air space, the barrier being non-porous and configured with an opening at one end and sealed to the outside at all other surfaces. The assembly also includes a barrier collar that is bendable to conform to being worn over a neck and shoulders of a person, the barrier collar providing an attachment component around which material from the open end of the barrier is wrapped to hold the protective barrier in place when the barrier collar is worn around the neck of the person. In one embodiment, the barrier assembly includes a plurality of holding clips placed over the barrier material extended around the barrier collar to hold the barrier material in place relative to the barrier collar. The PPP respirator system also includes a mantle made from a fabric material, the mantle shaped having a neck opening towards a middle section of the fabric material for placing of the mantle over a head of the person. When placed over the person's head, the mantle rests on the person's neck and shoulders and upper torso. The protective barrier extends from the barrier collar located below the mantle up through the neck opening to above the head of the person, enclosing the head within the barrier and preventing direct exposure to an exterior environment.

The PPP respirator system further includes an air intake system having a tube with a top opening and a bottom opening, the bottom opening having a flat surface abutting against and sealably connected on an exterior barrier surface surrounding a side opening in the barrier. The air intake system also includes a positive pressure device positioned inside of the tube to direct air into the barrier from the top opening of the tube through the tube and into the barrier, causing the barrier to inflate around the head of the person wearing the respirator and providing a steady flow of air into the barrier. The air intake system also includes a filter extended over to the top opening of the tube, the filter receiving and filtering all air entering the top opening of the tube, and a mechanism for securing the filter over the top opening of the tube.

According to another aspect, a method for manufacturing a portable, personal protective (PPP) respirator includes providing a barrier collar that is bendable to conform to being worn over a neck and shoulders of a person, the barrier collar utilized to create a protective barrier assembly by attaching an open end of a protective barrier to the barrier collar. The protective barrier is made of a pliable material that expands when air flow is provided into an interior of the material to create a volumetric interior air space in which the person's head can be placed to substantially reduce exposure to air-borne particulates within an exterior environment. The method also includes providing a mantle for placing over a head of the person, the mantle resting on the person's neck and shoulders and upper torso when placed over the person's head. When worn, the protective barrier extends from the barrier collar located below the mantle up through the neck opening to above the head of the person, enclosing the head within the barrier and preventing direct exposure to the exterior environment.

The method further includes providing an air intake system, the air intake system comprising (i) a tube with a top opening and a bottom opening, the bottom opening having a flat surface abutting against and sealably connected on an exterior barrier surface surrounding a side opening in the barrier. The method includes providing a positive pressure device positioned inside of the tube to direct air into the barrier from the top opening of the tube through the tube and into the barrier, causing the barrier to inflate around the head of the person wearing the respirator and providing a steady flow of air into the barrier. The method also includes providing a mechanism for securing a filter over the top opening of the tube, the filter extended over to the top opening of the tube when installed, the filter receiving and filtering all air entering the top opening of the tube. The mechanism includes a collar placed over extended ends of the filter to hold the filter securely in place against the top exterior surface of the tube and holders extending from an outer surface of the collar and stretched and secured over attachment projections located around an exterior perimeter of the tube to hold the collar and the filter in place.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 5 (5A-5F) presents an exploded view of the components of an air intake system of the PPP respirator system, in accordance with one or more embodiments of the disclosure;

DESCRIPTION OF ILLUSTRATIVE EMBODIMENTS

Figure 1:
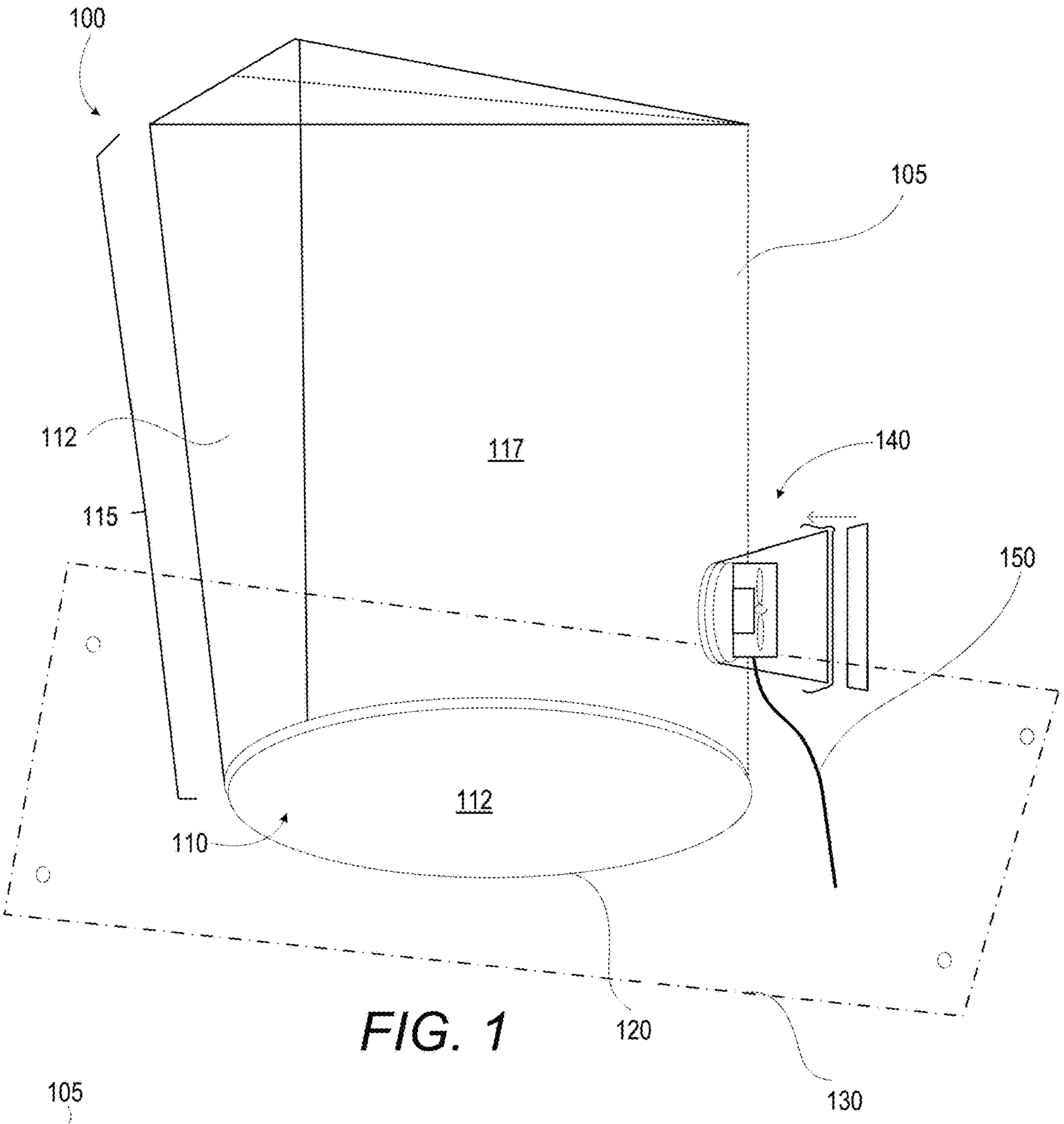
FIG. 1 presents a three-dimensional illustration of a portable, personal protective (PPP) air respirator system, in accordance with one or more embodiments of the disclosure.

The illustrative embodiments of the present disclosure provide the present disclosure provides portable, personal protective (PPP) respirator system and a method for manufacturing a PPP respirator. The PPP respirator system includes a protective barrier assembly that includes a protective barrier made of a pliable material and which expands when air flow is provided into an interior of the material to create a volumetric interior air space, the barrier being non-porous and configured with an opening at one end and sealed to the outside at all other surfaces. The assembly also includes a barrier collar that is bendable to conform to being worn over a neck and shoulders of a person, the barrier collar providing an attachment component around which material from the open end of the barrier is wrapped to hold the protective barrier in place when the barrier collar is worn around the neck of the person. In one embodiment, the barrier assembly includes a plurality of holding clips placed over the barrier material extended around the barrier collar to hold the barrier material in place relative to the barrier collar. The PPP respirator system also includes a mantle made from a fabric material, the mantle shaped having a neck opening towards a middle section of the fabric material for placing of the mantle over a head of the person. When placed over the person's head, the mantle rests on the person's neck and shoulders and upper torso. The protective barrier extends from the barrier collar located below the mantle up through the neck opening to above the head of the person, enclosing the head within the barrier and preventing direct exposure to an exterior environment.

The PPP respirator system further includes an air intake system having a tube with a top opening and a bottom opening, the bottom opening having a flat surface abutting against and sealably connected on an exterior barrier surface surrounding a side opening in the barrier. The air intake system also includes a positive pressure device positioned inside of the tube to direct air into the barrier from the top opening of the tube through the tube and into the barrier, causing the barrier to inflate around the head of the person wearing the respirator and providing a steady flow of air into the barrier. The air intake system also includes a filter extended over to the top opening of the tube, the filter receiving and filtering all air entering the top opening of the tube, and a mechanism for securing the filter over the top opening of the tube.

As provided within the disclosure, it is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized.

Thus, each term utilized herein is to be given its broadest interpretation given the context in which that term is utilized.

Certain coined terms are utilized herein in describing the unique features and functionality of the disclosure. Several other terms utilized throughout the disclosure are provided with functional descriptive names that represent the meanings and/or the context in which the terms are presented and/or utilized.

The accompanying figures present various aspects and/or features of the described embodiments, with certain features not expressly presented within the description herein. The following description of the illustrative embodiments can therefore be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein. Those of ordinary skill in the art will appreciate that the basic configurations depicted in the figures may vary. The illustrative components are not intended to be exhaustive, but rather are representative to highlight essential components that are utilized to implement aspects of the described embodiments. For example, other devices/components/features may be used in addition to or in place of the ones depicted and/or described. The depicted example is not meant to imply design, usage, or other limitations with respect to the presently described embodiments and/or the general innovation.

Within the descriptions of the different views of the figures, similar elements are provided similar names and reference numerals as those of the previous figure(s). It will be appreciated that for simplicity and clarity of illustration, elements illustrated in the figures have not necessarily been drawn to scale. For example, the dimensions of some of the elements can be exaggerated relative to other elements.

Those of ordinary skill in the art will appreciate that the hardware, firmware/software utility, and software components and basic configuration thereof depicted in the following figures may vary. For example, different configurations of any of the components of PPP respirator system may be provided, containing other devices/mechanism/components/features, which may be used in addition to or in place of the hardware depicted and/or described, and the devices may be differently configured. The depicted examples are therefore not meant to imply architectural, usage, or other limitations with respect to the presently described embodiments and/or the concepts of the general disclosure.

Referring now to the figures, it is appreciated that the features and functionality illustrated by the figures are not fully described by the brief descriptions, which serve only to introduce these features as ones known to the inventors at the time of submission of this disclosure. Additional features and functionality extend from the presented figures as natural extensions thereof, such as specific graphical user interfaces, specific types of notification, protocols utilized for communication, etc. Nothing within the presented figures is intended to be limiting with respect to any aspect of the innovation.

Figure 2:
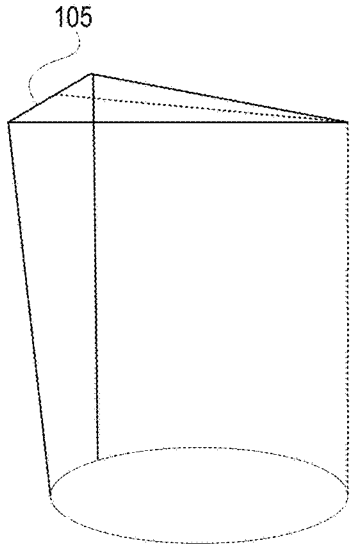
FIG. 2 illustrates an example barrier designed to provide a larger, flat, forward facing front surface area to facilitate wearing over a person's head, in accordance with one embodiment.
Figure 3A:
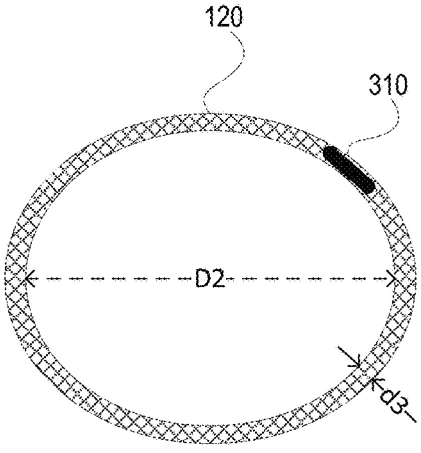
FIGS. 3A and 3B respectively illustrates an example barrier collar and barrier fastener/clip, according to one or more embodiments.
Figure 3B:

FIG. 1A provides an example portable, personal protective (PPP) respirator system. For completeness, references to the specific features presented in FIGS. 2-4 are provided during the description of FIG. 1, which presents more of an overview figure. FIG. 2 illustrates an example barrier designed to provide a larger, less constricting front surface area to facilitate wearing over a person's head, in accordance with one embodiment. FIGS. 3A and 3B respectively illustrates an example barrier collar and barrier fastener/clip, according to one or more embodiments. Similar components are presented with the same reference numerals to indicate the same component is being referenced. PPP respirator system 100 (or PPP respirator 100) includes protective barrier assembly 115 (collectively 105/FIGS. 2 and 110/FIG. 3A). Protective barrier assembly 115 includes: a protective barrier 105 (FIG. 2) made of a pliable material. The protective barrier 105 can be a plastic bag or other pliable container that is normally amorphous (or substantially amorphous) and which expands when air flow is provided to create a volumetric interior air space 117. The barrier 105 is non-porous and is shaped/created with an opening 112 at one end (shown as the bottom) and is otherwise sealed to the outside at all other surfaces. Protective barrier assembly 115 also includes a barrier collar 120 that is made of a material that is bendable (e.g., a silicone or rubber tube) to conform to being worn over a neck and shoulders of a person. The barrier collar 120 provides an attachment component around which material from the open end 112 of the protective barrier 105 is wrapped to hold the protective barrier 105 in place when the barrier collar 120 is placed/worn around the neck of the person.

In one embodiment, the barrier assembly 115 includes a plurality of holding clips 125 (FIG. 3B), which are placed over the barrier material (105) extended around the barrier collar 120 to hold the barrier material in place relative to the barrier collar 120. PPP respirator 100 also includes mantle 130 (FIG. 4A) made from a fabric material. In one embodiment, mantle 120 can be shaped as a pseudo-rectangular poncho having circular or oblong shaped neck opening 132 towards a middle section of the fabric material for placing of the mantle over a head of the person. When placed over the person's head, the mantle 130 rests on the person's neck and shoulders and upper torso. Accordingly, the protective barrier 105 extends from the barrier collar 120 located below the neck opening 132 of the mantle 130 up through the neck opening 132 to above the head of the person. The protective barrier 105 thus encloses the person's head within the barrier and prevents direct exposure of the person's face (in particular his/her mouth and nose) and head to an exterior environment.

According to one or more embodiment, the barrier collar 120 is a flexible, pliable tube made of silicone and has opposed ends that are connected together by a single plug 310 inserted at opposed ends into a respective one of the opposed ends of the barrier collar 120 to provide a substantially circular annulus that sits around a neck of the person wearing the PPP respirator 100. Also, according to one aspect, a diameter D2 of the barrier collar 120 is larger than a diameter dl of the neck opening 132 in the mantle 130. This difference in diameters helps to prevent the protective barrier assembly 115 (with barrier collar 120) from slipping out from under the mantle 130.

According to one aspect, the barrier 105 is transparent in at least a forward-facing direction 112 to allow the person to see through the barrier material (at 112) without obstruction. Also, the barrier 105 is capable of maintaining a positive pressure in a breathing environment and is sufficiently flexible to conform to the barrier collar 120 and allow the person to touch his/her face while the PPP respirator system 100 is being worn.

Figure 4D:
FIGS. 4B-4D illustrate components utilized to secure the mantle to the torso of a person, according to one and more embodiments.
Figure 4C:
Figure 4B:
Figure 4A:
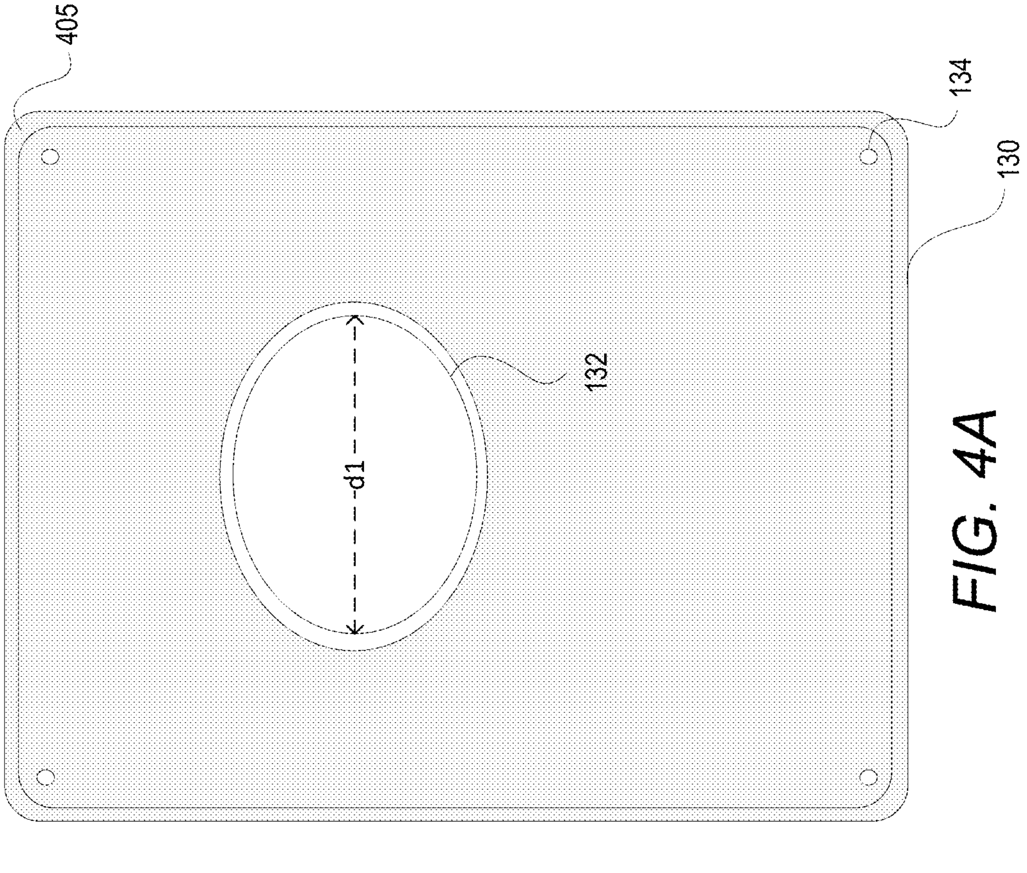
FIG. 4A illustrates an example mantle that can be placed over the head of a person as a part of the PPP respirator system, according to one or more embodiments.

FIG. 4A illustrates an example mantle that can be placed over the head of a person as a part of the PPP respirator system, according to one or more embodiments. FIGS.

4B-4D illustrate components utilized to secure the mantle to the torso of a person, according to one and more embodiments. With reference now to FIGS. 4A-4D and ongoing reference to FIG. 1, in one embodiment, mantle 130 includes a sealed edge 405 extending around an entire perimeter of the mantle 130. The sealed edge 405 has an internal volume in which a weighted material is placed to weigh down the mantle 130 to confirm to a body of the person wearing the mantle 130. In one or more embodiments, the weighted material is at least one of coarse grain sand or another weighted material that allows for contouring of the perimeter edge of the mantle touching the body of the person.

According to the illustrative embodiments, the mantle 130 comprising at least four holes 134, and PPP respirator system 100 further includes a pair of elastic shock cords 410 (FIG. 4B), each having first and second ends that are threaded respectively through a front hole 134 and an opposed back hole of the mantle 130 on each of the two lateral sides. When the mantel is being worn, the shock cords 410 located to extend underneath the arms of the person. At least one clasp 415 (FIG. 4C) is placed on a corresponding at least one end of each of the pair of elastic shock cords 410, the clasp 415 enabling the person to reduce a length of the shock cord extending under the person's arm and cinched to provide a more snug, comfortable fit of the mantle against an upper torso of the person. The other end of the cord 410 can be tied to a length of metal or hard plastic 420 (FIG. 4D). When the mantle is worn around the neck, with the shock cords 410 synched underneath the arms, the shock cords 410 maintains a physical seal of the mantle material on the chest, back and shoulders of the person.

According to one aspect, PPP respirator 100 further includes air intake system 140. FIGS. 5A-5F present an exploded view of the components of an air intake system of the PPP respirator system, in accordance with one or more embodiments of the disclosure. As illustrated by FIG. 5A and with continuing reference to FIG. 1, air intake system 140 includes a tube 505 with a top opening and a bottom opening (generally shown), the bottom opening having a flat surface (annulus 520) abutting against and sealably connected on an exterior barrier surface surrounding a side opening in the barrier. Air intake system 140 also includes a positive pressure device (515) positioned inside of the tube 505 to direct air into the protective barrier 105 entering from the top opening of the tube 505, passing through the tube 505 and into inside volume of the barrier 105. This movement of air causes barrier 105 to inflate around the head of the person wearing the PPP respirator 100 and provide a steady flow of air into the barrier 105. Excess air passes outwards under the collar through a build up of positive pressure as additional intake air fills barrier 105.

According to another aspect, PPP respirator 100 further includes filter 510 extended over to the top opening of the tube 505. The filter 510 is physically sealed against and receives and filters all air entering the top opening of the tube 505. Accordingly, PPP respirator 100 also includes a mechanism (e.g., filter/tube perimeter collar 530) for securing the filter 510 over the top opening of the tube 505. In one or more embodiments, the mechanism includes collar 530 (FIG. 5C) placed over the extended ends of the filter 510 to hold the filter 510 securely in place against the top exterior surface of the tube 505. In one embodiment, the collar 530 is press fitted onto the edge of the tube to hold the filter in place. In another embodiment, and as illustrated by FIG. 5D, the mechanism also includes one or more elastic bands 534 having a first segment attached at respective holders 532 extending from an outer surface of the collar 530 and stretched and secured over attachment projections 536 located around an exterior perimeter of the tube 505 to hold the collar 530 and the filter 510 securely in place.

According to yet another aspect and as illustrated by FIG. 5B, PPP respirator 100 also includes a barrier retainer (annulus) 525 located on an interior space of barrier 105, directly opposite to the flat surface annulus 520 of the bottom opening. Barrier retainer 525 is screwably attached, via screws 540 inserted through screw holes 527, to the flat adjacent surface of annulus 520 from the inside surface opposed to the exterior barrier surface to physically secure the air intake system 140 to the barrier 105. To facilitate the sealing of the barrier, barrier retainer annulus 525 and flat surface annulus 520 are designed with opposed male and female mating affordances 528 and 529 that interlock (see insert FIG. 5E) into each other to seal barrier 105 between the two annuluses.

According to one or more embodiments, PPP respirator 100 further includes a sealing ring 550 that is placed around a top and outside surface of barrier retainer 525 to maintain the barrier retainer 525 within a positive pressure, internal to barrier 105 and prevent leak points from developing.

In accordance with one or more embodiments, the positive pressure device 515 is (or includes) at least one air mover 517. The air intake system 140 then includes a power cable 150 attached to the air mover 517 and extending away from the air mover 517. In one or more embodiments, the power cable terminates in one of a USB or mini-USB adapter. The USB power cable 150 enables the air mover 517 to be powered by an external power source that provides output power via a USB port. As presented within FIGS. 9A-9B, the air mover 517 can be powered by a cell phone or portable USB battery pack 910.

Figure 6:
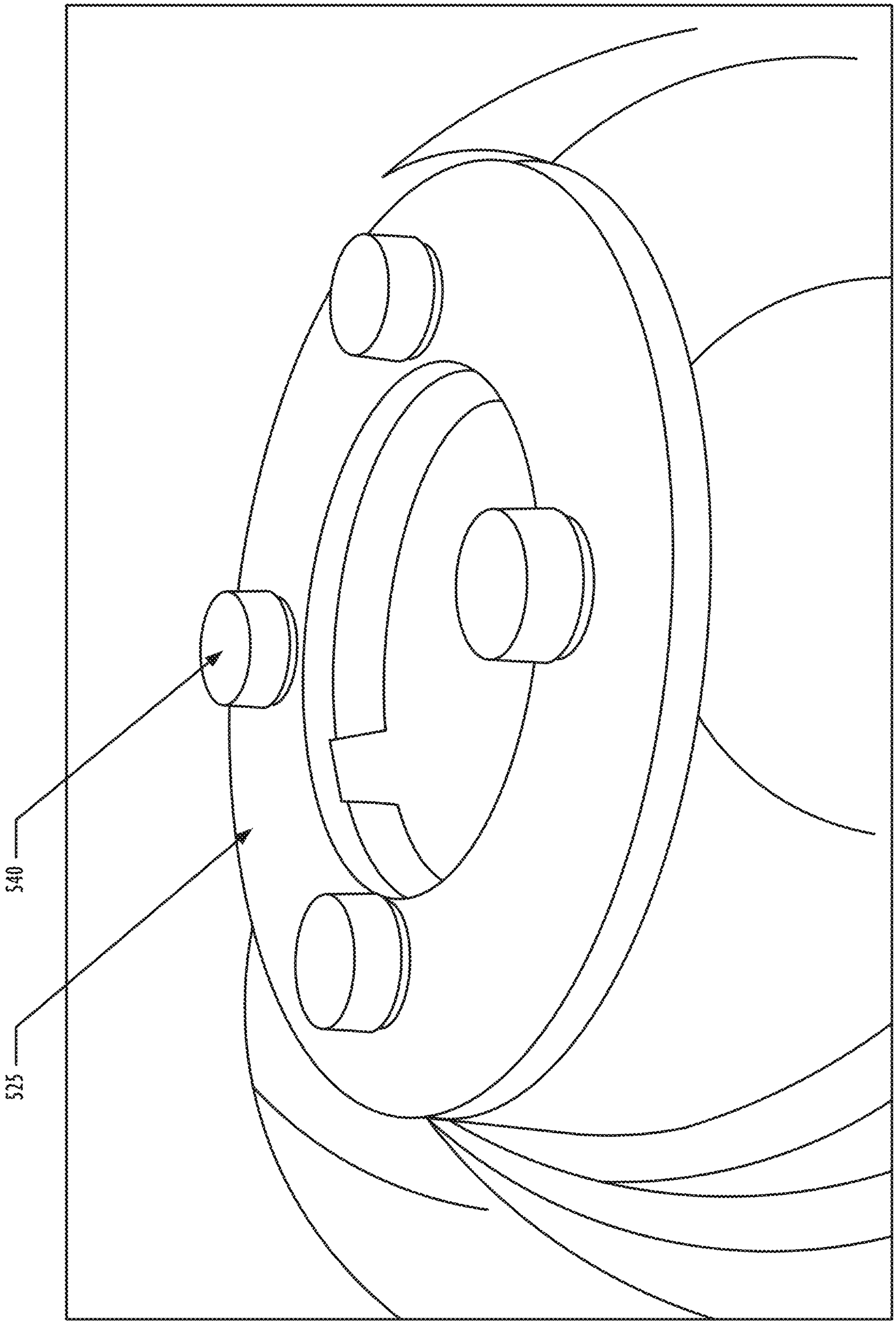
FIG. 6 provides a close-up view of the interior annulus and screws used to screwably attach the air intake system to the protective air barrier, according to one or more embodiments.
Figure 7:
FIG. 7 presents an image of the PPP respirator system when note being worn, where the barrier is not inflated, according to one or more embodiments.
Figure 8A:
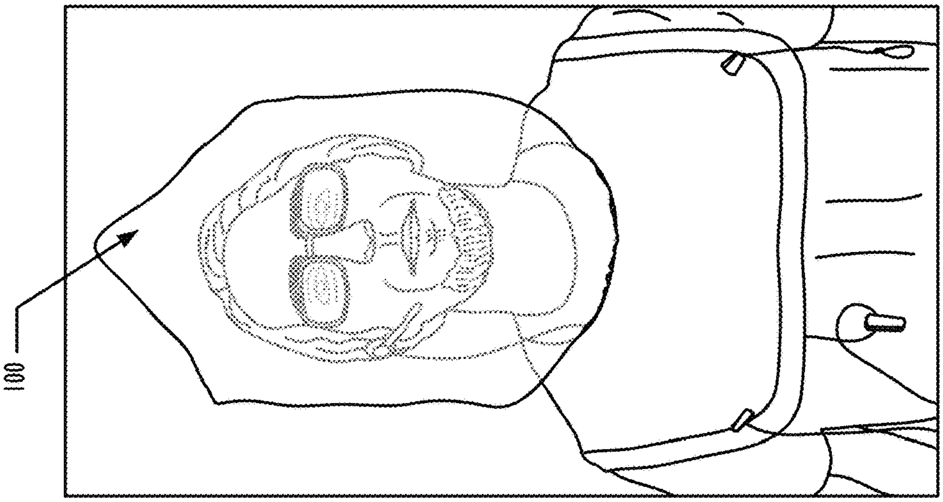
FIGS. 8A-8C provides different views of the PPP respirator system being worn by a person, in accordance with one or more embodiments of the disclosure.
Figure 8B:
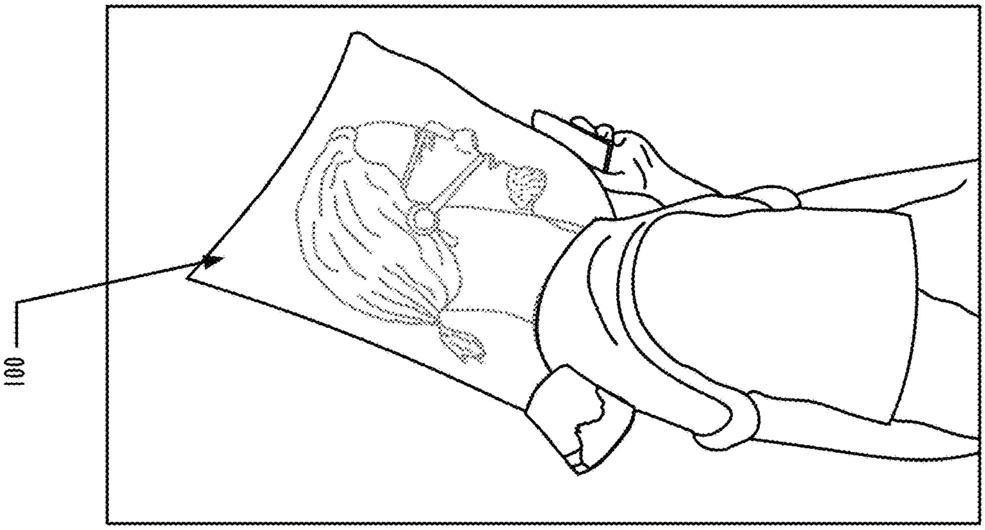
Figure 8C:
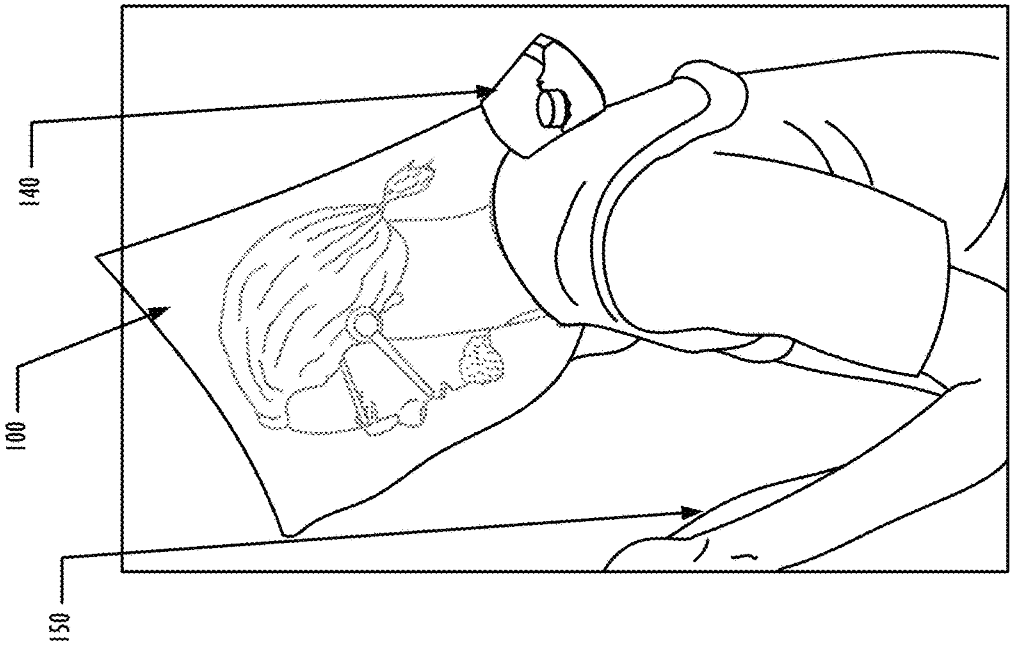
Figure 9B:
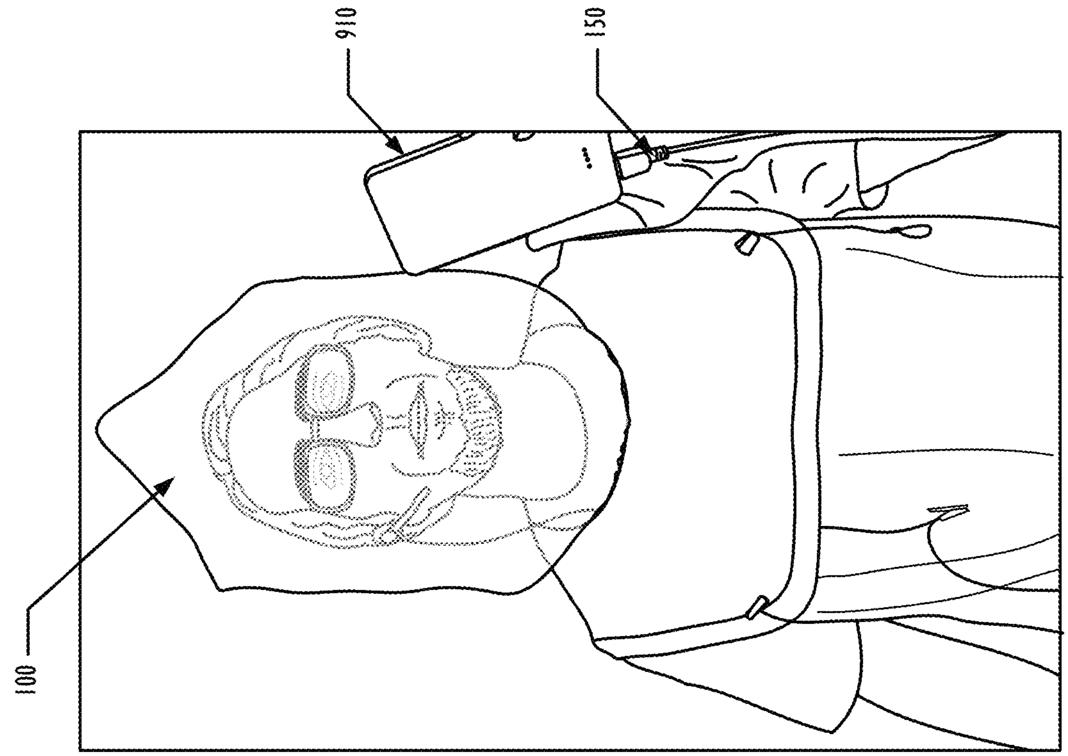
FIGS. 9A-9B respectively presents a universal serial bus (USB) cable and portable power source for the air mover within the air intake system of the PPP respirator system, according to one or more embodiments.
Figure 9A:
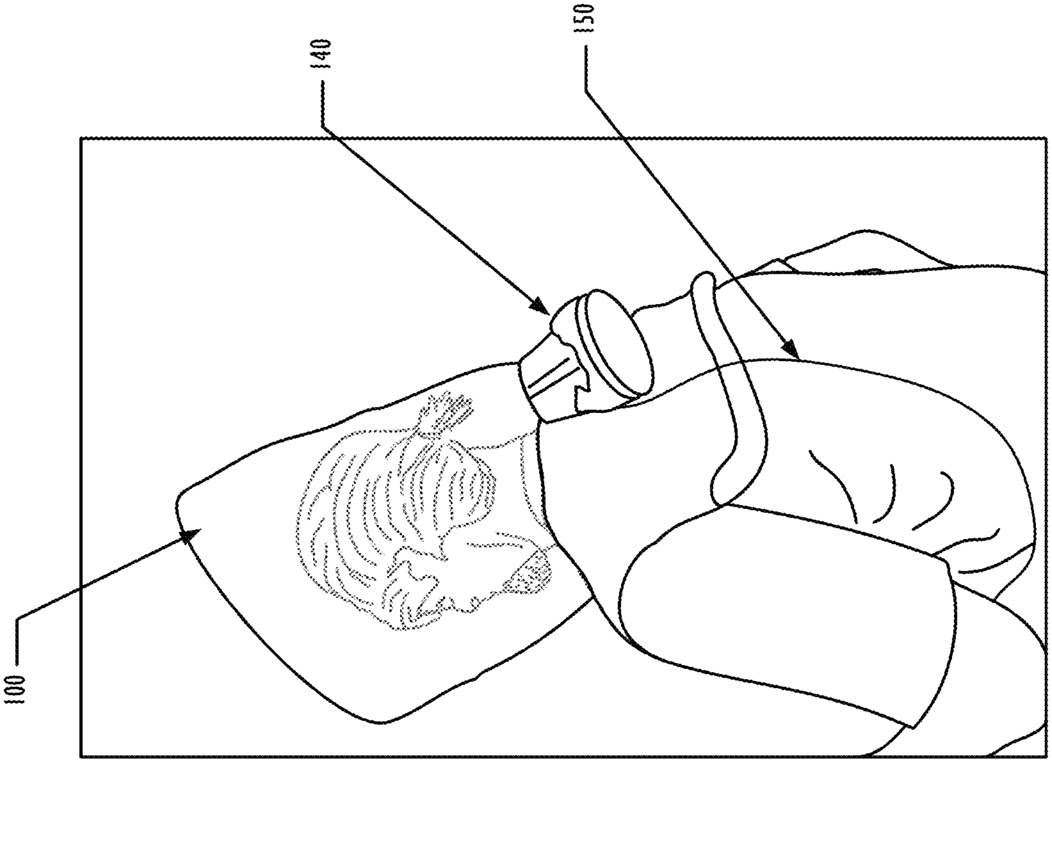

FIG. 6 provides a close-up view of the interior annulus and screws 540 used to screwably attach the air intake system to the protective air barrier, according to one or more embodiments. FIG. 7 presents an image of the PPP respirator system when not being worn, where the barrier is not inflated, according to one or more embodiments. FIG. 8A provides a front view of the PPP respirator system being worn by a person, in accordance with one or more embodiments of the disclosure. As shown, the front face 112 is relative flat and wider to allow for better comfort of the user and enables clearer visibility out of the barrier. FIGS. 8B-8C illustrate a left-side and a right-side view of the PPP respirator system 100, with air intake system 140 in fluid attachment with protective air barrier 105, according to one or more embodiments. FIGS. 9A-9B respectively presents a universal serial bus (USB) cable 150 and portable power source 910 for the air mover 515 (FIG. 5) within the air intake system 140 of the PPP respirator system, according to one or more embodiments.

Figure 10:
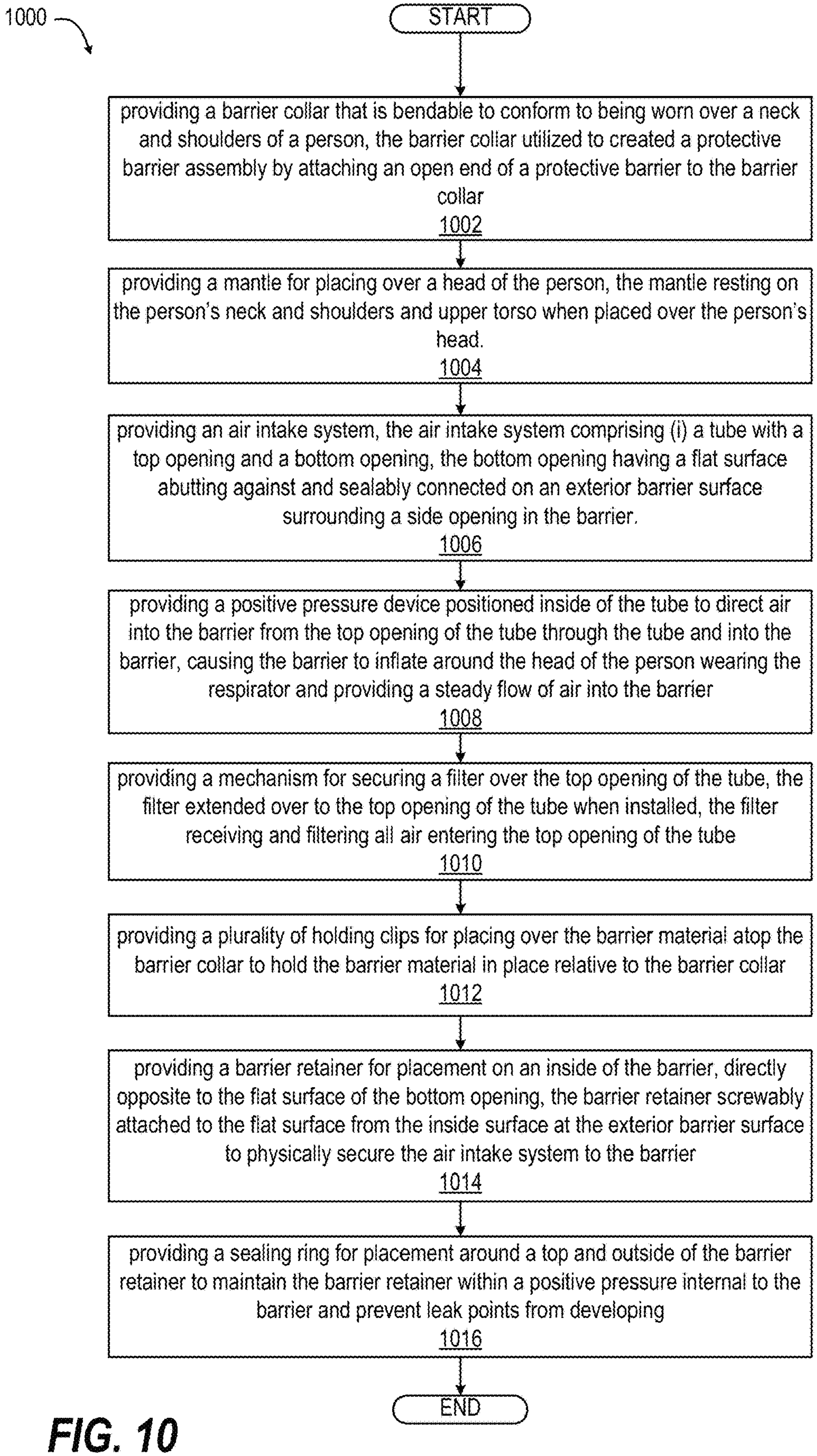
FIG. 10 provides a method for manufacturing a PPP respirator system, according to one or more embodiments.

Turning now to FIG. 10, there is provided a method 100 for manufacturing a PPP respirator system 100, according to one or more embodiments. Method 100 includes providing a barrier collar that is bendable to conform to being worn over a neck and shoulders of a person (block 1002). The barrier collar is utilized to create a protective barrier assembly by attaching an open end of a protective barrier to the barrier collar. The protective barrier is made of a pliable material that expands when air flow is provided into an interior of the material to create a volumetric interior air space in which the person's head can be placed to substantially reduce exposure to air-borne particulates within an exterior environment. Method 1000 also includes providing a mantle for placing over a head of the person, the mantle resting on the person's neck and shoulders and upper torso when placed over the person's head (block 1004). When worn, the protective barrier extends from the barrier collar located below the mantle up through the neck opening to above the head of the person, enclosing the head within the barrier and preventing direct exposure to the exterior environment.

Method 100 further includes providing an air intake system, the air intake system comprising (i) a tube with a top opening and a bottom opening, the bottom opening having a flat surface abutting against and sealably connected on an exterior barrier surface surrounding a side opening in the barrier (block 1006). Method 1000 includes providing a positive pressure device positioned inside of the tube to direct air into the barrier from the top opening of the tube through the tube and into the barrier, causing the barrier to inflate around the head of the person wearing the respirator and providing a steady flow of air into the barrier (block 1008). Method 1000 also includes providing a mechanism for securing a filter over the top opening of the tube, the filter extended over to the top opening of the tube when installed, the filter receiving and filtering all air entering the top opening of the tube (block 1010). The mechanism includes a collar placed over extended ends of the filter to hold the filter securely in place against the top exterior surface of the tube and holders extending from an outer surface of the collar and stretched and secured over attachment projections located around an exterior perimeter of the tube to hold the collar and the filter in place.

Method 1000 also includes providing a plurality of holding clips for placing over the barrier material extended around the barrier collar to hold the barrier material in place relative to the barrier collar (block 1012). Method 1000 includes providing a barrier retainer for placement on an inside of the barrier, directly opposite to the flat surface of the bottom opening, the barrier retainer screwably attached to the flat surface from the inside surface at the exterior barrier surface to physically secure the air intake system to the barrier (block 1014). Method 1000 includes providing a sealing ring for placement around a top and outside of the barrier retainer to maintain the barrier retainer within a positive pressure internal to the barrier and prevent leak points from developing (block 1016).

In the above flow chart presented herein, certain steps of the method can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

Thus, the above-described features of the embodiment provide a portable, personal protective (PPP) air respirator system and method for protecting a user from allergens, viruses, bacteria, pollutants and other particulates in the air supply being breathed in by the user. According to one embodiment, the PPP air respirator includes a barrier that is made up of a pliable volumetric material, such as a plastic bag that expands when air pressure is applied to the interior and which is non-porous and non-toxic. The barrier is ideally selected to be transparent to enable a user to see through the barrier without obstruction. The barrier is further one that is pliable and does not tear easily, enabling a user to touch the barrier and portions of the user's face and head beneath the barrier. In one embodiment, the barrier may be partially opaque or otherwise non-transparent in one or more areas. In one or more embodiments, the barrier includes a face segment sealably connected to a head segment, where the face segment is the non-transparent segment to allow the user to clearly see around them.

The barrier would be of a material capable of maintaining a positive pressure in the breathing environment and be flexible enough to conform to the surface it is intended to seal against. The barrier would derive some portion of it's shape from the positive pressure inside the barrier. In one embodiment the barrier would allow the subject to see outside the breathing environment. In a second embodiment the subject would not be able to see outside the breathing environment.

The PPP air respirator includes a mantle, which is a fabric material configured or shaped as an open-sided vest with a circular or oblong shaped cutout towards a middle section of the material for placing of the mantle over a user's head. The entire perimeter of the fabric material is weighted using coarse (large grain) sand or some other weighted material that allows for give and adjustment of the perimeter touching the body of the user. The mantle can be round, rectangular, or square, although other shapes are contemplated. In at least one embodiment, one side of the mantle is shorter than the other so the mantle can be worn in reverse orientation (i.e., rotated 180 degrees) to provide a different fit by the particular user. A different configuration of the mantle can be provided to allow for use with larger breasted individuals to ensure a close fit around and between the breast.

An elastic shock cord is extended from a front corner to a back corner (or vice versa) of the mantle on each of the two lateral sides. When the mantle is worn, the shock cord extends underneath the user's arms. These cords can then be cinched to provide a snug, comfortable fit of the mantle against the user's upper torso. In one embodiment, a pair of rings are attached to/on the front end of the chord allowing a person to easily grab the cord and pull it for tightness. Alternate embodiments provide a different tightening mechanism, including a stretchable, elastic material that stretches to accommodate different size torsos.

A barrier collar is placed around the outside of the open end of the barrier, which is first pulled through the opening in the mantle. In one or more embodiments, the barrier collar is a flexible, pliable tube made of silicone. The two ends of the tube are connected together by an insert or an exterior tubular connector to provide a circular annulus utilized as the barrier collar. The size of the collar can be adjusted for different size users by cutting off a portion of the pliable tube to adjust the size downwards. Inversely, an additional piece of tubing can be attached to the original tube to increase the diameter of the tube when connected to create the barrier collar. According to one design aspect, in order to prevent the barrier from slipping out of the mantle, the barrier collar is preferably larger in diameter than the diameter of the hole within the mantle. Once the barrier ends have been pulled through the hole in the mantle, the open end of the barrier is wrapped around the barrier collar from the inside to the outside. Holding clips are put in place on the tube over the barrier. During installation of the holding clips, the tube can be squeezed in to prevent tearing of the barrier. The holding clips can also be slid along the collar to securely hold the barrier to the tube.

When worn around the neck, the mantle looks like a half-length life vest with the weighted perimeter edges and cinched chord enabling the mantle to maintain a physical seal of the mantle material on the user's chest, back and shoulders. The seal is further enhanced by using the elastic shock cords with clasps extending underneath the user's arms to securely bind the back segment with the front segment of the vest. The barrier extends from below the mantle from the barrier collar up to above the head of the user, enclosing the head within the barrier.

The PPP air respirator system also includes an air intake system or air intake mechanism. As shown, the air intake system includes a conical shaped tube or conical frustrum with circular openings at both the top and bottom. The bottom opening abuts against and is sealably connected to an exterior of a side section of the barrier. The air system can be attached anywhere on the barrier, and extend outwards from the barrier to the front, sides, or back of the user. When utilized for a long plane ride, for example, the air system can be attached to the side or the front of the user to enable the user to sit more comfortably.

In one embodiment, the bottom opening has a flared or flat end, extending substantially perpendicular to the sides of the frustrum and presenting a surface that is substantially parallel to (or which extends laterally against) the exterior surface of the barrier. According to one embodiment, the PPP air respirator further includes one heat seal, which is perpendicular to the plane of the barrier to provide better fit and vision area. A barrier retainer (annulus) is placed on the inside of the barrier, directly opposite to the flared bottom surface of the frustrum and is screwably attached to the interior surface of the barrier and the flared bottom surface of the frustrum. In one embodiment, four (4) screw holes are presented in the flared bottom surface and four offset holes are similarly presented within the barrier retainer, aligned with the screw holes in the bottom surface. Four screws are inserted through the screw holes extending from the barrier retainer through the barrier and into the screw holes of the bottom surface of the frustrum. The screws hold the barrier retainer to the main body (i.e., the frustrum) of the air intake system. According to one aspect, given the soft material makeup of the barrier, the screws are easy to push through the barrier and screw into place. Thus, no tools or pre-existing patterns are needed within the barrier, and the barrier can easily be replaced with another barrier by simply removing the screws and the barrier retainer.

According to one embodiment, alignment pins on the main body of the air intake system hold the barrier retainer in place while the screws are being inserted. The alignment pins also help ensure the barrier does not slip. Once the barrier retainer is in place, a sealing ring is placed around the outside of the screwed-together pieces (barrier retainer, impinged portion of barrier, and bottom surface) so the connected pieces are contained within the positive pressure, thus preventing the any leak points from developing. A hole is then punched though the barrier wall within the area of the barrier that is encircled by the barrier retainer.

In one embodiment the air system includes a positive pressure device such as a fan, powered air pump, or manual air pump position inside of the frustrum. In an alternate embodiment, the positive pressure device includes a container of previously pressurized air/gas(es). In another alternate embodiment the air system would be a remote air source with a positive pressure device. With each implementation, the positive pressure would not rely directly on the lungs of the subject.

The size of the conical frustrum is selected by design to be able to insert one or more small air movers or fans within the frustrum. The position of the fan is such that, when turned on, the fan generates a pull of air from the top section of the frustrum (the outside environment) through the frustrum and into the barrier, causing the barrier to inflate around the head of the user and providing a steady flow of fresh air into the barrier. The depth of the frustrum can be designed to enable more than one fan to be inserted into the frustrum to increase the static pressure intaking/pulling air into the barrier.

Each air mover or fan is powered by a USB or mini-USB cable that is attached to an external power source, such as a cellular phone battery pack or a computer or other USB power source. A small wattage fan is utilized. When powered by a standard cell phone, the air system can provide continued air supply for up to 12 or more hours. With this small wattage USB powered fan, the resulting positive pressure air system conducts acceptable air/gas(es) to the breathing environment inside the barrier.

The air intake system includes a filter extended over the larger open end of the conical tube. The filter can be made of any material, with a preferred material being one that is capable of filtering out the desired particulate the user wishes to filter out of the intake air (from viruses, chemicals, to dust particles). The filter material selected affects the static pressure of the fan utilized as the air mover of the air system. Finer grade filters can be used if a fan with enough pulling force is utilizing within air system.

The filter is set over the open end of the top of the conical frustrum. A collar is then placed over the extended ends of the filter to hold the filter securely in place against the top of the conical frustrum. Several elastics are stretched from respective holding projections extending on the exterior of the collar. The other end of the elastics are then stretched and secured over attachment projections located around the exterior perimeter of the conical frustrum. The elastics hold the collar, and by extension the filter, in place.

Aspects of the present innovation are described above with reference to flowchart illustrations and/or block diagrams of methods, apparatus (systems) and computer program products according to embodiments of the innovation. It will be understood that in an automated manufacturing environment, each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In the above description, exemplary embodiments in which various aspects of the disclosure may be practiced are described in general detail to enable those skilled in the art to practice the invention. It is to be understood that other embodiments may be utilized and that logical, architectural, programmatic, mechanical, electrical and other changes may be made without departing from the spirit or scope of the present disclosure. The above description is an extended summary and therefore, should not to be taken in a limiting sense, and the scope of the present disclosure will be defined by appended claims and equivalents thereof. Other aspects of the disclosure that stem from and/or are extensions of the above-described processes are presented generally within the aforementioned descriptions and/or the figures accompanying this submission. Nothing within the present descriptions is to be taken as limiting on the scope of the greater application of the disclosure within the shipping and transportation industry/space or more general perishable product space.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the invention not be limited to the particular embodiments disclosed for carrying out the disclosure, but that the disclosure will include all embodiments falling within the scope of any appended claims. Moreover, the use of the terms first, second, etc. do not denote any order or importance, but rather the terms first, second, etc. are used to distinguish one element from another.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A portable, personal protective (PPP) respirator system comprising:

a protective barrier assembly comprising:

a protective barrier made of a pliable material and which expands when air flow is provided to create a volumetric interior air space, the protective barrier being non-porous and configured with an opening at one end and otherwise sealed to the exterior of the pliable material; and a barrier collar that is bendable to conform to being worn over a neck and shoulders of a person, the barrier collar providing an attachment component around which the pliable material from the opening of the protective barrier is wrapped to hold the protective barrier in place when the barrier collar is worn around the neck of the person;

a mantle made from a fabric material, the mantle shaped as a pseudo-rectangular poncho having circular or oblong shaped neck opening towards a middle section of the fabric material for placing of the mantle over a head of the person, the mantle resting on the person's neck and shoulders and upper torso when placed over the person's head;

an air intake system, the air intake system comprising (i) a tube with a top opening and a bottom opening, the bottom opening having a flat surface abutting against and sealably connected on an exterior barrier surface surrounding a side opening in the protective barrier; and a positive pressure device positioned inside of the tube to direct air into the protective barrier from the top opening of the tube through the tube and into the protective barrier, causing the protective barrier to inflate around the head of the person wearing the respirator and providing a steady flow of air into the protective barrier; and a mechanism for securing a filter over the top opening of the tube, the filter extended over to the top opening of the tube when installed, the filter receiving and filtering all air entering the top opening of the tube, the mechanism comprising: a collar placed over extended ends of the filter to hold the filter securely in place against a top exterior surface of the tube; and holders extending from an outer surface of the collar and stretched and secured over attachment projections located around an exterior perimeter of the tube to hold the collar and the filter in place;

wherein the protective barrier extends from the barrier collar located below the mantle up through the neck opening to above the head of the person, enclosing the head within the protective barrier and preventing direct exposure to an environment exterior to the protective barrier.

2. The PPP respirator system of claim 1, further comprising:

a barrier retainer located on an inside of the barrier, directly opposite to the flat surface of the bottom opening, the barrier retainer screwably attached to the flat surface from the inside of the barrier to physically secure the air intake system to the barrier.

3. The PPP respirator system of claim 2, further comprising a sealing ring that is placed around a top and outside of the barrier retainer to maintain the barrier retainer within a positive pressure internal to the barrier and prevent leak points from developing.

4. The PPP respirator system of claim 1, wherein the positive pressure device is at least one air mover, the air intake system further comprising:

a power cable attached to the air mover and extending away from the air mover ending in one of a USB or mini-USB adapter, the power cable enabling the air mover to be powered by an external power source that provides output power via a USB port.

5. The PPP respirator of claim 1, the mantle further comprising a sealed edge extending around an entire perimeter of the PPP respirator and having an internal volume in which a weighted material is placed to weigh down the mantle to confirm to a body of the person wearing the mantle.

6. The PPP respirator of claim 5, wherein the weighted material is at least one of coarse grain sand or another weighted material that allows for contouring of a perimeter edge of the mantle touching the body of the person.

7. The PPP respirator of claim 1, wherein the mantle comprising at least four holes, the PPP respirator further comprising:

a pair of elastic shock cords, each having first and second ends that are threaded respectively through a front hole and an opposed back hole of the mantle on each of two lateral sides, the pair of elastic shock cords located to extend underneath the arms of the person; and at least one clasp placed on a corresponding at least one end of each of the pair of elastic shock chords, the clasp enabling the person to reduce a length of a corresponding one of the pair of elastic shock cords extending under the person's arm and cinched to provide a more snug, comfortable fit of the mantle against an upper torso of the person;

wherein when worn around the neck, with the pair of elastic shock cords synched, the pair of elastic shock cords maintains a physical seal of the mantle material on the chest, back and shoulders of the person.

8. The PPP respirator of claim 1, wherein:

the barrier collar is a flexible, pliable tube made of silicone and having opposed ends that are connected together by a single plug inserted at the opposed ends into a respective one of the opposed ends of the barrier collar to provide a substantially circular annulus that sits around the neck of the person wearing the PPP respirator; and the barrier assembly comprises a plurality of holding clips placed over the protective barrier extended around the barrier collar to hold the protective barrier in place relative to the barrier collar.

9. The PPP respirator of claim 1, wherein a diameter of the barrier collar is larger than a diameter of the neck opening in the mantle to prevent the protective barrier assembly from slipping out from under the mantle.

10. The PPP respirator system of claim 1, wherein the barrier is transparent in at least a forward-facing direction to allow the person to see through the protective barrier without obstruction.

11. The PPP respirator system of claim 1, wherein the protective barrier is capable of maintaining a positive pressure in a breathing environment and is sufficiently flexible to conform to the barrier collar and allow the person to touch his/her face while the PPP respirator system is being worn.

12. A method for manufacturing a portable, personal protective (PPP) respirator, the method comprising:

providing a barrier collar that is bendable to conform to being worn over a neck and shoulders of a person, the barrier collar utilized to create a protective barrier assembly by attaching an open end of a protective barrier to the barrier collar, wherein the protective barrier is made of a pliable material that expands when air flow is provided into an interior of the material to create a volumetric interior air space in which the person's head is placed to substantially reduce exposure to air-borne particulates within an exterior environment;

providing a mantle for placing over the head of the person, the mantle resting on the person's neck and shoulders and upper torso when placed over the person's head;

providing an air intake system, the air intake system comprising (i) a tube with a top opening and a bottom opening, the bottom opening having a flat surface abutting against and sealably connected on an exterior barrier surface surrounding a side opening in the protective barrier; and a positive pressure device positioned inside of the tube to direct air into the protective barrier from the top opening of the tube through the tube and into the protective barrier, causing the protective barrier to inflate around the head of the person wearing the respirator and providing a steady flow of air into the protective barrier; and providing a mechanism for securing a filter over the top opening of the tube, the filter extended over to the top opening of the tube when installed, the filter receiving and filtering all air entering the top opening of the tube, the mechanism comprising: a collar placed over extended ends of the filter to hold the filter securely in place against a top exterior surface of the tube; and holders extending from an outer surface of the collar and stretched and secured over attachment projections located around an exterior perimeter of the tube to hold the collar and the filter in place;

wherein when worn, the protective barrier extends from the barrier collar located below the mantle up through the neck opening to above the head of the person, enclosing the head within the protective barrier and preventing direct exposure to the exterior environment.

13. The method of claim 12, further comprising:

providing a plurality of holding clips for placing over the barrier material extended around the barrier collar to hold the protective barrier in place relative to the barrier collar.

14. The method of claim 12, further comprising:

providing a barrier retainer for placement on an inside of the barrier, directly opposite to the flat surface of the bottom opening, the barrier retainer screwably attached to the flat surface from the inside of the barrier to physically secure the air intake system to the barrier.

15. The method of claim 14, further comprising providing a sealing ring for placement around a top and outside of the barrier retainer to maintain the barrier retainer within a positive pressure internal to the barrier and prevent leak points from developing.

16. A portable, personal protective (PPP) respirator system comprising:

a protective barrier assembly comprising:

a protective barrier made of a pliable material and which expands when air flow is provided to create a volumetric interior air space, the protective barrier being non-porous and configured with an opening at one end and otherwise sealed to the exterior of the pliable material;

a barrier collar that is bendable to conform to being worn over a neck and shoulders of a person, the barrier collar providing an attachment component around which the pliable material from the opening of the protective barrier is wrapped to hold the protective barrier in place when the barrier collar is worn around the neck of the person;

a mantle made from a fabric material, the mantle shaped as a pseudo-rectangular poncho having circular or oblong shaped neck opening towards a middle section of the fabric material for placing of the mantle over a head of the person, the mantle resting on the person's neck and shoulders and upper torso when placed over the person's head;

an air intake system comprising:

a tube with a top opening and a bottom opening, the bottom opening having a flat surface abutting against and sealably connected on an exterior barrier surface surrounding a side opening in the barrier; and a positive pressure device positioned inside of the tube to direct air into the barrier from the top opening of the tube through the tube and into the barrier, causing the barrier to inflate around the head of the person wearing the respirator and providing a steady flow of air into the barrier;

a filter extended over to the top opening of the tube, the filter receiving and filtering all air entering the top opening of the tube; and a mechanism for securing the filter over the top opening of the tube, the mechanism comprising:

a collar placed over extended ends of the filter to hold the filter securely in place against a top exterior surface of the tube; and one or more elastic bands having a first segment attached at respective holders extending from an outer surface of the collar and stretched and secured over attachment projections located around an exterior perimeter of the tube to hold the collar and the filter in place;

wherein the protective barrier extends from the barrier collar located below the mantle up through the neck opening to above the head of the person, enclosing the head within the protective barrier and preventing direct exposure to an environment exterior to the protective barrier.

* * * * *